United States Patent [19]
Iwaki et al.

[11] Patent Number: 6,004,687
[45] Date of Patent: Dec. 21, 1999

[54] CYLINDRICAL ALKALINE BATTERY

[75] Inventors: Hirofumi Iwaki, Katano; Takeshi Okubo, Hirakata; Yoko Noda, Hirakata; Masanobu Abe, Hirakata, all of Japan

[73] Assignee: Matsushita Electric Industrial Co., Ltd., Osaka, Japan

[21] Appl. No.: 08/943,149

[22] Filed: Oct. 3, 1997

[30] Foreign Application Priority Data

Oct. 31, 1996 [JP] Japan .................................. 8-289528
Apr. 15, 1997 [JP] Japan .................................. 9-097004

[51] Int. Cl.⁶ .............................. H01M 2/34; H01M 2/12
[52] U.S. Cl. .................................. 429/1; 429/53; 429/56; 429/157; 429/174
[58] Field of Search .............................. 429/1, 174, 157, 429/53, 56

[56] References Cited

U.S. PATENT DOCUMENTS 5,173,371  12/1992  Huhndorff et al. .

FOREIGN PATENT DOCUMENTS 0309101  3/1989  European Pat. Off. .
0505080  9/1992  European Pat. Off. .
59-98452  6/1984  Japan .

*Primary Examiner*—John S. Maples
*Attorney, Agent, or Firm*—Stevens, Davis, Miller & Mosher, L.L.P.

[57] ABSTRACT

A cylindrical cell is disclosed which is so constructed that an insulating ring is seated on the outside of the sealed part of the opening part of a cell case, the terminal face of a negative electrode plate is depressed below the outer face of a facing label covering the insulating ring, and a gas discharge hole formed in the negative electrode plate is concealed with the insulating ring. This construction prevents the cell from allowing flow of a current to an adjacent cell and consequently from being charged by the adjacent cell. Since the cell uses a thermally shrinkable insulating facing member, it enjoys improved reliability of the outer covering. Even if a plurality of such cells of the construction described above are used as arranged in series and part of the cells are erroneously connected with the direction of polarity thereof reversed to the remaining cells, the possibility of the reversely connected cells allowing flow of current to the remaining cells and consequently being charged by the remaining cells will be precluded and the possibility of the device in use being smeared or harmed by the electrolyte otherwise suffered to leak when the reversely connected cells are charged by the remaining cells will be eliminated.

12 Claims, 3 Drawing Sheets

CYLINDRICAL ALKALINE BATTERY

BACKGROUND OF THE INVENTION

1. Field of the Invention

This invention relates to a mouth-sealing structure in a cylindrical alkaline battery.

2. Description of the Prior Art

The cylindrical alkaline battery such as, for example, an alkaline dry cell uses a highly concentrated aqueous caustic alkali solution as an electrolyte. If this battery has a gap, very small as it is, therefore, it tends to suffer leakage of the electrolyte due to the so-called creeping, namely the exudation through the gap. The alkaline dry cell, accordingly, is provided with a mouth-sealing structure which is highly capable of tightly sealing the shell thereof.

In a device which uses a plurality of batteries arranged in series, for example, if the device is operated in such a state that one of the batteries is connected with the direction of polarity thereof reversed to the remaining batteries, the reversely connected battery will possibly burst when it is charged by the other batteries and caused to undergo internally a strong gas-generating reaction and, consequently, the internal pressure thereof is suffered to increase past the durability inherently owned by the mouth-sealing structure capable of sealing the shell of the battery with prominent tightness. The device, therefore, must be prevented from this accident.

For the purpose of solving this problem, mouth-sealing structures of varying types provided with an explosion-proof mechanism have been heretofore proposed for use in alkaline dry cells (as published in JP-A-59-98,452, for example).

A typical mouth-sealing structure will be specifically described below with reference to drawings.

FIG. 4 is a halved cross section of a conventional alkaline dry cell.

In a cell case 1, a positive electrode agent 2 formed of manganese dioxide and graphite and shaped cylindrically is inserted. The cylinder of this agent 2 is packed therein with an alkaline electrolyte formed mainly of potassium hydroxide and a negative electrode gel substance 3 having a gelling material and a zinc allow powder as main components thereof through the medium of a separator 4. The alkaline dry cell is further provided with a negative electrode collector 5 and a resinous gasket 6 adapted to block the opening part of the cell case 1 and possessed of a thin-wall part (an annular thin-wall part as depicted in the diagram) 7 which breaks under the pressure of gas. A negative electrode terminal plate 9 concurrently serving as a negative electrode terminal and containing a gas discharge hole 8 is mounted on the resinous gasket 6 as welded to the head part of the negative electrode collector 5 and inserted into the opening part of the cell case 1 so that the cell case 1 may be tightly sealed by folding the opening part inward. The outer lateral face of the cell case 1 and the continuing outer face of the sealed part of the opening part of the cell case 1 which has been folded inward are covered with a facing label 10 which is a thermally shrinkable insulating facing member. A positive electrode terminal 11 is disposed contiguously to the bottom face of the cell case 1.

The alkaline dry cell constructed as described above is prevented from the accidental burst mentioned above because the thin-wall part 7 of the resinous gasket 6 fractures as a safety valve when the pressure in the cell case 1 is raised past a prescribed level by the gas generated inside the cell and the gas in the cell is released through the fracture and discharged from the cell via the gas discharge hole 8 in the negative electrode terminal plate 9, with the result that the internal pressure of the cell case 1 will be lowered.

In a device which uses a plurality of dry cells each constructed as described above and together arranged in series, for example, if this device is operated in such a state that part of the batteries are erroneously connected with the direction of polarity thereof reversed to the remaining batteries, the erroneously connected cells will be charged with the other cells.

FIG. 5 illustrates the arrangement of four serially connected alkaline dry cells of the conventional construction, in which one of the four cells is connected with the direction of polarity thereof reversed to the remaining cells. The positive electrode terminal face of the reversely connected cell contacts the positive electrode terminal face of the adjoining cell and the negative electrode terminal face of the reversely connected cells contacts the negative electrode terminal face of the adjoining cell. In this case, the reversely connected cell is charged by the other cells and caused to undergo a strong gas-generating reaction. If the internal pressure of the cell case is consequently increased past a prescribed level, the annular thin-wall part of the resinous gasket as an explosion-proof mechanism for preventing the cell from the burst will fracture and the gas in the cell case will be discharged from the cell via the gas discharge hole in the negative terminal plate.

The actuation of the explosion-proof mechanism in response to an abnormal rise of the internal pressure of the cell indeed prevents the cell from the burst. It, however, has the possibility that the emanating gas will entrain the electrolyte and impel it to leak through and spout from the cell.

The electrolyte which is used in the alkaline dry cell such as, for example, a cylindrical alkaline cell is a highly concentrated aqueous caustic alkali solution. For the purpose of preventing the electrolyte from doing harm to the device in use when the explosion-proof mechanism is actuated, therefore, the alkaline dry cell is required to be so constructed that the electrolyte, even when the gas emanates through the gas discharge hole in the negative terminal plate, may neither leak nor scatter widely.

In the dry cell which is faced with such a thermally shrinkable member as mentioned above, the shrinking outer face of the facing label covering the terminal face side of the opening part of the cell case is possibly caused to peel, tear, or fracture by the friction or drop during the transportation of the cell or the insertion of the cell into the device or the extraction of the cell therefrom. Further, since the opening part of the cell case concurrently serving as the positive electrode terminal and the negative electrode terminal which approximate closely to each other are made of metallic materials, the positive and the negative electrode have the possibility of forming a short-circuit through the medium of the leading end part of a coil spring terminal on the device side while the cell is being loaded and causing the cell to gather heat and leak the electrolyte. Thus, this dry cell is required to prevent this trouble.

SUMMARY OF THE INVENTION

This invention aims to solve the problem of the prior art mentioned above. When a plurality of dry cells are used as arranged in series and part of the dry cells are erroneously connected with the direction of polarity thereof reversed to the remaining cells, this invention prevents the reversely connected dry cells from being charged by the other dry cells owing to the continuity of flow of the electric current. It further improves the reliability of the coating of a cylindrical dry cell faced with a thermally shrinkable insulating facing member which is inferior in reliability to the coating of the metallically faced dry cell. Thus, it is advantageous in terms of safety and useful for a device necessitating the use of a dry cell.

DETAILED DESCRIPTION OF THE INVENTION

To accomplish the object described above, this invention provides a cylindrical alkaline cell which has an insulating ring seated outside the sealed part of a cell case curved inside to seal the opening part, the terminal face of a negative electrode terminal plate depressed below the outer face of an insulating facing member covering the insulating ring, a gas discharge hole in the negative electrode terminal plate concealed with the insulating ring, or the insulating ring attached by contact adhesion to the outer side of the sealed part.

When a plurality of dry cells of the construction described above are used as arranged in series, even if part of the dry cells are erroneously connected with the direction of polarity thereof reversed to the remaining dry cells, the negative electrode side of the reversely connected dry cell and the negative electrode side of the dry cell adjoining thereto neither establish an electric continuity nor allow flow of an electric current therebetween because they have the outer faces of the facing labels, namely insulating facing members covering the insulating rings, exposed to direct mutual contact and the terminal faces of the negative electrode plates are not allowed to contact each other. As a result, the explosion-proof mechanism of the dry cell is not actuated and the electrolyte is not suffered to leak out of the cell because the reversely connected dry cell is not charged and the gas-generating reaction is not caused in the dry cell.

The alkaline dry cell of this invention allows the outer face of the insulating facing member covering the outside of the sealed part of the opening part of the cell case concurrently serving as a positive electrode terminal to protrude from the terminal face of the negative electrode. Even if the protruding face of the facing member tends to peel, tear, or fracture while the cell is being loaded in or extracted from the device in use or if the insulating facing member peels or fractures near the opening part of the cell case, the insulating property of the dry cell can be secured by having the insulating ring interposed between the outside of the sealed part of the opening part of the cell case and the insulating facing member. Further, the fast attachment of the insulating ring can secure the insulating property of the dry cell without inducing accidental fall of the insulating ring.

Now, the present invention will be described specifically below with reference to working examples.

Figure 1:
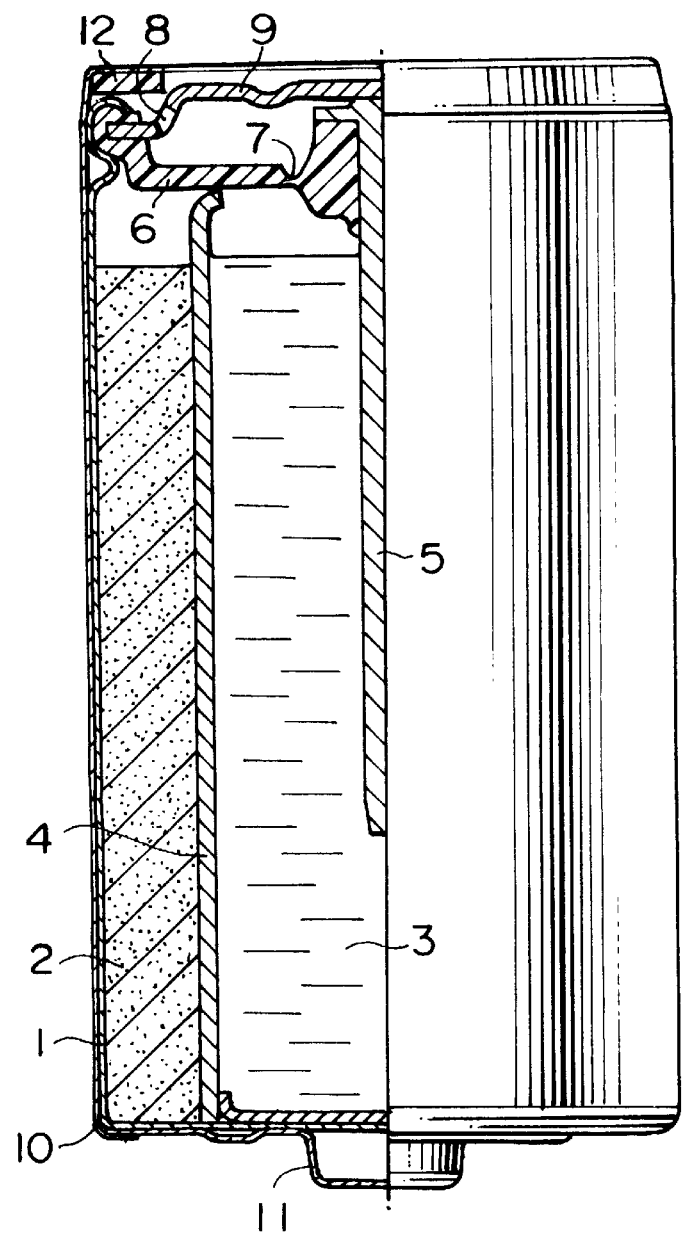
FIG. 1 is a halved cross section of an alkaline dry cell in one embodiment of this invention.

FIG. 1 is a halved cross section of an alkaline dry cell in one working example of this invention.

Figure 4:
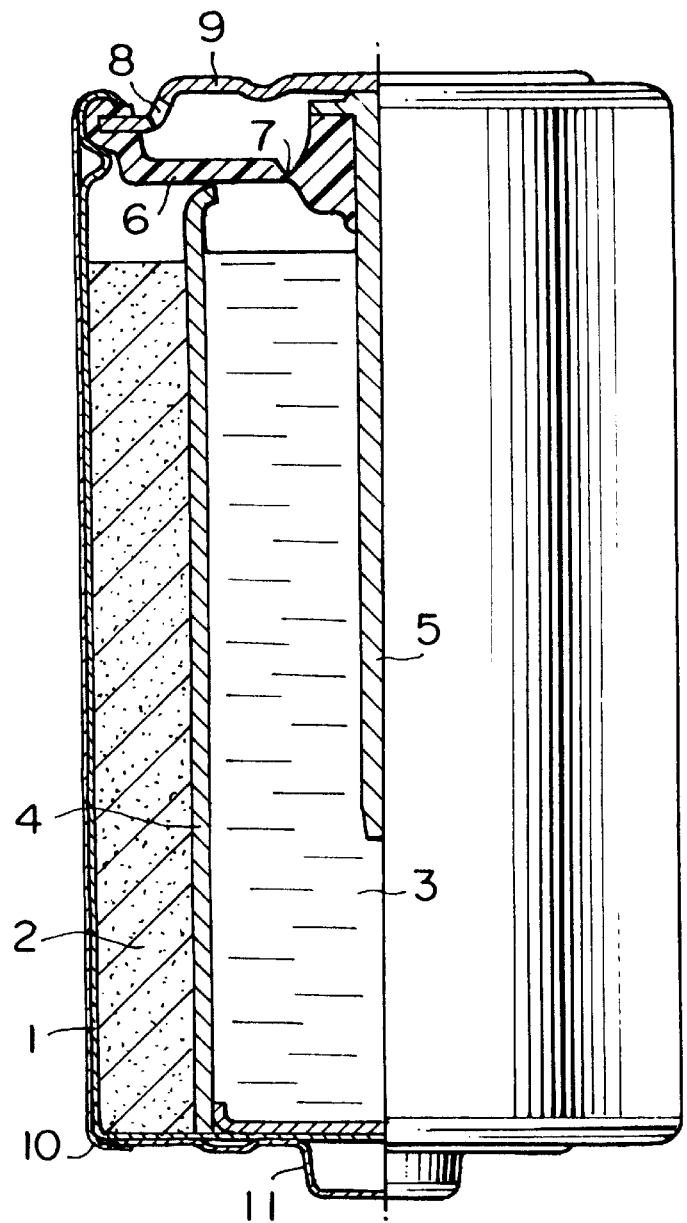
FIG. 4 is a halved cross section of a conventional alkaline dry cell.
Figure 5:
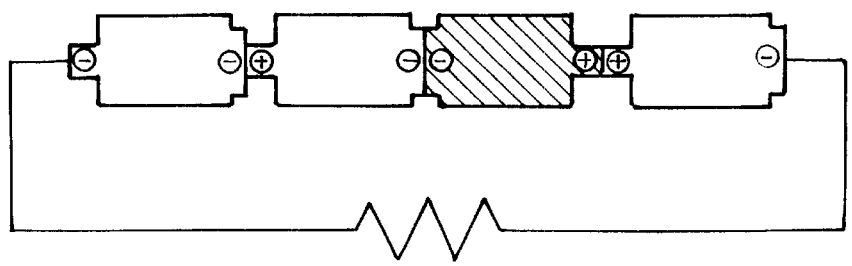
FIG. 5 is a diagram illustrating the arrangement of conventional alkaline dry cells, with part of the dry cells connected reversely to the remaining dry cells.

With reference to FIG. 1, an insulating ring 12 is seated outside the sealed part of the opening part of a cell case 1. The terminal face of a negative electrode plate 9 is depressed by a margin of about 1 mm below the outer face of a facing label 10, i.e. a thermally shrinkable insulating facing member covering the insulating ring 12. The depth of this depression is only required to be such what when the negative electrode terminal sides of opposed dry cells adjoin each other, the terminal faces of the negative terminal plates 9 do not contact each other. The insulating ring 12 is so adapted as to conceal a gas discharge hole 8 in a state enabling the inside diameter side terminal face thereof to approximate closely to the lateral wall face of the negative electrode terminal plate 9 containing a gas discharge hole 8. This alkaline dry cell is identical structurally in the other respects to the conventional alkaline dry cell of FIG. 4.

As concrete examples of the material to be used for this insulating ring 12, plastic materials such as polyethylene, polypropylene, styrene resin, and urethane resin, rubber, paper, and non-woven fabrics of synthetic fibers such as vinylon and rayon may be cited.

Figure 2:
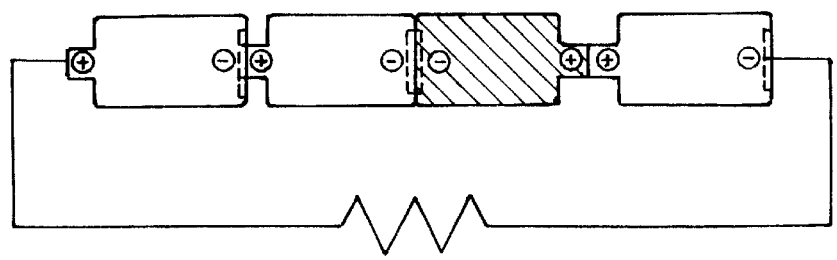
FIG. 2 is a diagram illustrating the arrangement of alkaline dry cells of the embodiment of this invention, with part of the dry cells connected reversely to the remaining dry cells.

FIG. 2 illustrates a device using four serially connected alkaline dry cells of the present working example of this invention, wherein one of the four dry cells are connected with the direction of polarity thereof reversed to the remaining dry cells. In this case, since the terminal face of the negative electrode terminal plate of the reversely connected dry cell and the terminal face of the negative terminal plate of the dry cell adjoining thereto are severally depressed below the outer faces of the facing labels covering the insulating rings seated outside the sealed parts of the opening parts of the respective cell cases, the outer faces of the facing labels covering the insulating rings contact each other and the terminal faces of the negative electrode terminal plates do not contact each other. As a result, the reversely connected dry cell is neither allowed to continue the flow of electric current to the other dry cell nor charged by the other dry cell, the dry cells are not suffered either to actuate the explosion proof mechanism or to leak or scatter the electrolyte outside the dry cells, and the device in use is prevented from being smeared or fractured.

Further, owing to the construction in which the insulating ring is enabled to conceal the gas discharge hole in the negative electrode terminal plate, the electrolyte which is spouted together with the gas through the gas discharge hole in the negative terminal plate can be intercepted by the insulating ring and the scatter of the electrolyte outside the dry cell can be minimized even when the internal pressure of the dry cell is increased to the extent of actuating the explosion proof mechanism by some reason other than the unwanted charging due to the reversed connection such as, for example, the generation of hydrogen gas by the corrosion of zinc of the negative electrode induced by the impurity entering the negative electrode gel substance.

Since the outer face of the insulating facing member covering the outside of the sealed part of the opening part of the cell case concurrently serving as the positive electrode terminal protrudes from the terminal face of the negative electrode, the protruding face of the facing member possibly tends to peel, tear, or sustain a scratch while the cell is inserted into the device in use or extracted therefrom. Even when the insulating facing member peels or sustains a scratch in the proximity of the opening part of the cell case, the insulating property of the cell can be secured by interposing the insulating ring between the outside of the sealed part of the opening part of the cell case and the insulating facing member.

Figure 3:
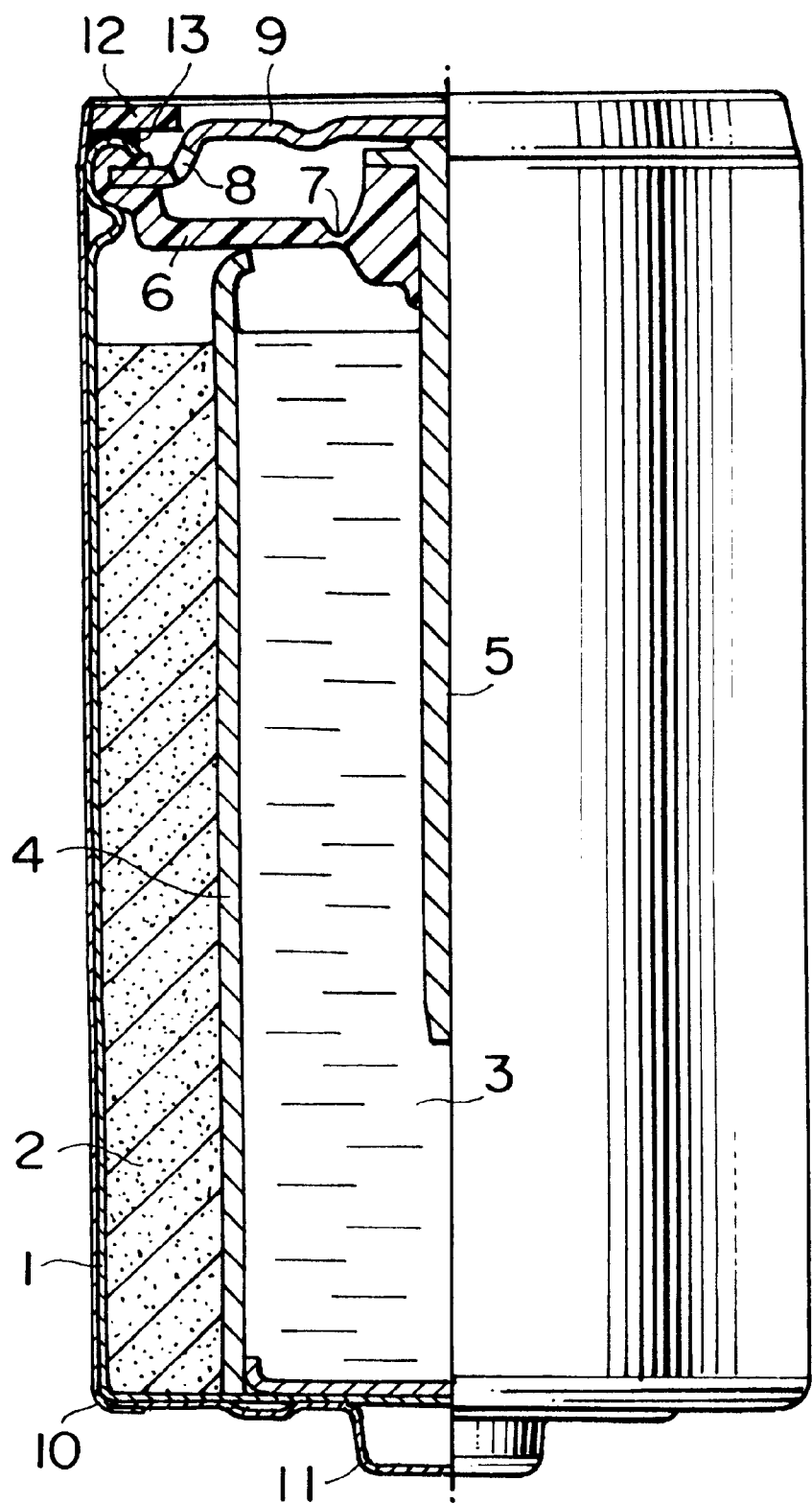
FIG. 3 is a halved cross section of an alkaline dry cell in another embodiment of this invention.

In the case of the dry cell in which the insulating ring 12 is joined with the aid of an adhesive agent 13 to the outside of the sealed part of the opening part of the cell case 1 as illustrated in FIG. 3 and the other components are identical to those of the preferred embodiment of this invention illustrated in FIG. 1, the insulating property of this dry cell will be more infallibly secured without suffering accidental separation of the insulating ring even if the insulating facing member peels or sustains a scratch in the proximity of the opening part of the cell case.

The adhesive agent 13 may be epoxy resin or hotmelt type adhesive agent so long as it is capable of joining the insulating ring and the outside of the sealed part of the opening part of the cell case by contact adhesion.

As described above, this invention can realize an excellent cylindrical alkaline cell which is faced with a thermally shrinkable insulating facing member inferior in reliability to the metallic facing member used on an equivalent cell and, therefore, is enabled to enjoy improved reliability of the outer covering. If a plurality of such cells are used as arranged in series and part of the cells happen to be erroneously connected with the direction of polarity thereof reversed to the remaining cells, the possibility of the explosion-proof mechanisms in the cells being actuated and the electrolyte in the cells being consequently compelled to leak out of the cells and scatter will be precluded because no current flows between the reversely connected cells and the remaining cells and the former cells are not charged by the latter cells.

What is claimed is:

1. A cylindrical alkaline cell comprising a cylindrical cell case packed with a power-generating element, a negative electrode terminal plate for sealing said cell case by being attached to an opening part of said cell case through a resinous gasket, a thermally shrinkable insulating facing member facing a periphery of said cell case, an insulating ring seated outside a sealed part of said cell case, wherein said insulating ring has a thickness causing a terminal face of said negative electrode terminal plate to be positioned so as to be spaced apart from and below an outer face of said insulating facing member covering said insulating ring.

2. A cylindrical alkaline cell according to claim 1, wherein a gas discharge hole formed in said negative electrode terminal plate is concealed with said insulating ring.

3. A cylindrical alkaline cell according to claim 1, wherein said insulating ring is adhered to the outside of the sealed part of said cell case curved inside to seal said opening part.

4. A cylindrical alkaline cell according to claim 2, wherein said insulating ring is adhered to the outside of the sealed part of said cell case curved inside to seal said opening part.

5. A cylindrical alkaline cell according to claim 1, wherein said insulating ring comprises a material selected from the group consisting of polyethylene, polypropylene, styrene resin, urethane resin, rubber, paper, vinylon, and rayon.

6. A cylindrical alkaline cell according to claim 3, wherein said insulating ring is adhered to said outside of the sealed part of said cell case by an adhesive agent selected from the group consisting of an epoxy resin and a hotmelt adhesive.

7. A cylindrical alkaline cell comprising a cylindrical cell case packed with a power-generating element, a negative electrode terminal plate for sealing said cell case by being attached to an opening part of said cell case through a resinous gasket, said negative electrode terminal plate having formed therein a gas discharge hole, an insulating ring seated outside a sealed part of said case curved inside to seal said opening part wherein said gas discharge hole is concealed with said insulating ring.

8. A cylindrical alkaline cell according to claim 7, wherein said cell further comprises a thermally shrinkable insulating facing member facing a periphery of said cell case, and wherein a terminal face of said negative electrode terminal plate is positioned so as to be spaced apart from and below an outer face of said insulating facing member covering said insulating ring.

9. A cylindrical alkaline cell according to claim 7, wherein said insulating ring is adhered to the outside of the sealed part of said cell case curved inside to seal said opening part.

10. A cylindrical alkaline cell according to claim 8, wherein said insulating ring is adhered to the outside of the sealed part of said cell case curved inside to seal said opening part.

11. A cylindrical alkaline cell according to claim 7, wherein said insulating ring comprises a material selected from the group consisting of polyethylene, polypropylene, styrene resin, urethane resin, rubber, paper, vinylon, and rayon.

12. A cylindrical alkaline cell according to claim 9, wherein said insulating ring is adhered to said outside of the sealed part of said cell case by an adhesive agent selected from the group consisting of an epoxy resin and a hotmelt adhesive.

* * * * *